United States Patent [19]

Aoshima et al.

[11] Patent Number: 4,864,577
[45] Date of Patent: Sep. 5, 1989

[54] HIGHLY REPETITIVELY PULSED LASER DEVICE

[75] Inventors: Shinichiro Aoshima; Yutaka Tsuchiya, both of Shizuoka, Japan

[73] Assignee: Hamamatsu Photonics Kabushiki Kaisha, Shizuoka, Japan

[21] Appl. No.: 203,118

[22] Filed: Jun. 7, 1988

[30] Foreign Application Priority Data

Jun. 9, 1987 [JP] Japan ........................ 142262

[51] Int. Cl.$^4$ ........................... H01S 3/10; H01S 3/98
[52] U.S. Cl. ....................................... 372/18; 372/25; 372/30; 372/10
[58] Field of Search ................... 372/25, 18, 10, 92, 372/93, 21, 29, 30

[56] References Cited

U.S. PATENT DOCUMENTS

| | | | |
|---|---|---|---|
| 3,815,046 | 6/1974 | Johnson et al. | 372/18 |
| 4,176,327 | 11/1979 | Wayne et al. | 372/18 |
| 4,760,577 | 7/1988 | Aoshima | 372/25 |

FOREIGN PATENT DOCUMENTS 8004771 3/1982 Netherlands .

OTHER PUBLICATIONS

Jan. 1984, vol. 9, No. 1, OPTICS LETTERS, Mollenauer and Stolen, pp. 13–15.
Oct. 1974, vol. 19, No. 4, SOV. PHYS. TECH. PHYS., pp. 552 and 554.
Oct. 1986, vol. 19, No. 10, THE REVIEW OF LASER ENGINEERING, pp. 897–907, Aoshima and Tsuchiya.

Primary Examiner—James W. Davie
Attorney, Agent, or Firm—Finnegan, Henderson, Farabow, Garrett, & Dunner

[57] ABSTRACT

A highly repetitively pulsed laser device is provided including a feedback system simple in construction which returns a light pulse emitted from a laser resonator to the laser resonator so that the light pulse is superposed on a light pulse in the laser resonator.

6 Claims, 3 Drawing Sheets

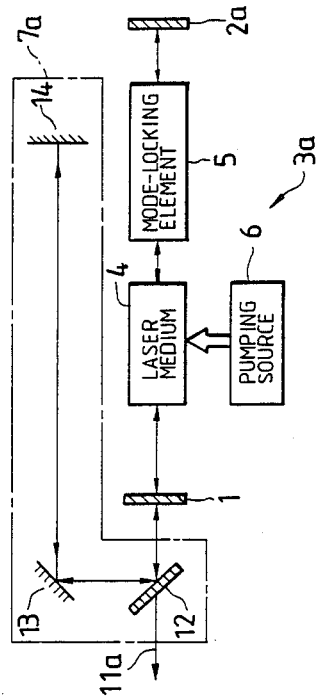
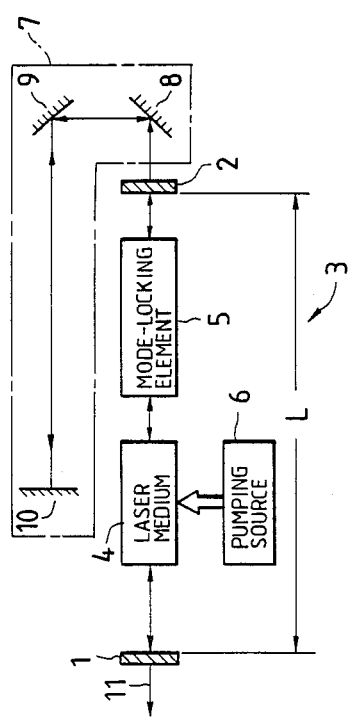
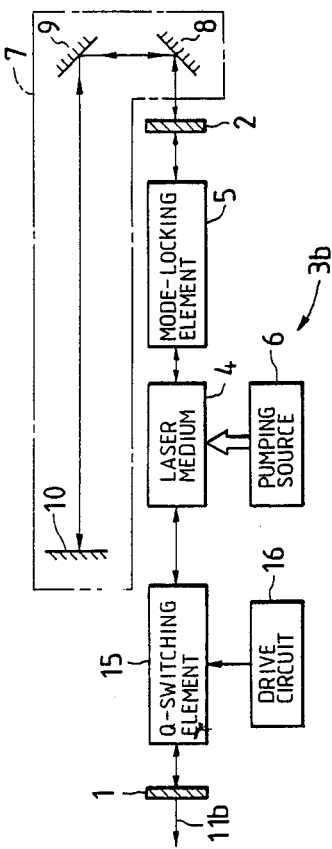
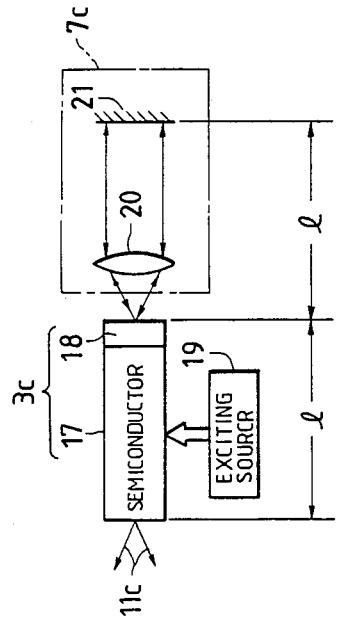

HIGHLY REPETITIVELY PULSED LASER DEVICE

BACKGROUND OF THE INVENTION

1. Field of the Invention

This invention relates to a highly repetitively pulsed laser device with a laser resonator which forms "go" and "return" paths for a light pulse.

2. Description of Related Art

Examples of a highly repetitively pulsed laser device are an active mode-locked laser device in which an acousto-optical (AO) element inserted in a laser resonator is modulated with a frequency $f_0=c/(2L)$, where L is the laser resonator length equal to the mode interval so that a high-speed light pulse having a short time width is produced, and a passive mode-locked device in which a saturable absorber dye solution is inserted in the laser resonator so that a high-speed light pulse having a short time width is produced. In the above-described active mode-locked laser device, reflection of a high frequency electrical signal for modulation of the AO element with an ultrasonic wave is monitored, and electrical control is so performed that the reflection of the high frequency electrical signal is stabilized and the light pulse output is stabilized. On the other hand, in the above-described passive mode-locked laser device, the concentration of the saturable absorber dye solution and the magnitude of the exciting energy are so controlled that the light pulse output is stabilized.

However, the active mode-locked laser device suffers from a difficulty that to achieve stabilization of the light pulse output, the electrical control for stabilization of the strength of the ultrasonic wave applied to the AO element is rather intricate.

The passive mode-locked laser device is disadvantageous in that, in the stabilization of the output light pulse, it is difficult to adjust the magnitude of the exciting energy with respect to the concentration of the saturable absorber dye solution because, in association with the deterioration of the dye, adjustment of the concentration of the saturable absorber dye solution is difficult.

SUMMARY OF THE INVENTION

In view of the foregoing, an object of this invention is to provide a highly repetitively pulsed laser device which is provided with a feedback system simple in construction which can be adjusted with ease, so that a stable light pulse is produced, and in which the average output is increased by reducing the pulse width of the light pulse.

The foregoing and other objects of the invention have been achieved by the provision of a highly repetitively pulsed laser device comprising a laser resonator that forms "go" and "return" paths for a light pulse, and a feedback system that returns a light pulse emitted from the laser resonator to the laser resonator so that the light pulse is superposed on a light pulse in the laser resonator.

Preferably, the light pulse emitted from the laser resonator forming the "go" and "return" paths is returned into the laser resonator by means of the feedback system, so that it is superposed on the light pulse in the laser resonator. Therefore, when compared with highly repetitively pulsed laser devices having no feedback systems, the highly repetitively pulsed laser device of the invention outputs a light pulse which is stable and short in pulse width, and is therefore high in average output.

BRIEF DESCRIPTION OF THE DRAWINGS

FIG. 1 is an explanatory diagram, partly as a block diagram, showing the arrangement of one example of a highly repetitively pulsed laser device according to the present invention;

FIG. 2 is an explanatory diagram of another preferred embodiment of the laser device according to the present invention;

FIG. 3 is an explanatory diagram of another preferred embodiment of the laser device according to the present invention;

FIG. 4 is an explanatory diagram of another preferred embodiment of the laser device according to the present invention;

DETAILED DESCRIPTION OF THE PREFERRED EMBODIMENT

Figure 5:
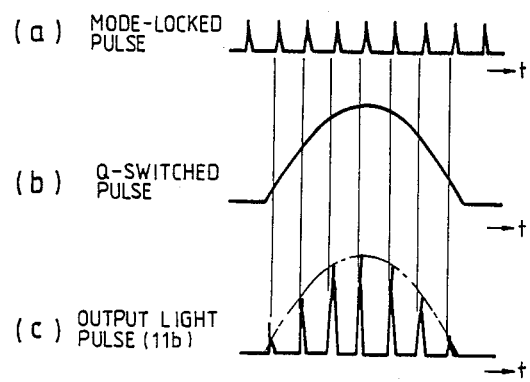
FIG. 5 is a pulse waveform diagram for a description of the operation of the laser device shown in FIG. 4.

FIG. 1 shows one example of a passive mode-locked liquid laser device such as a passive mode-locked laser to which the technical concept of the invention is applied.

In FIG. 1, reference numeral 1 designates an output mirror and 2 a reflecting mirror which transmit a part of a light pulse. Mirrors 1 and 2 form a laser resonator 3 having a resonator length L which provides "go" and "return" paths for a light pulse. A laser medium 4 of Rhodamine 6G or the like, and a mode-locking element 5 of saturable absorber dye are provided between the output mirror 1 and the reflecting mirror 2. Further, in FIG. 1 reference numeral 6 designates a pumping source for exciting the laser medium and reference numeral 7 designates a feedback system including total reflection mirrors 8, 9, and 10. The feedback system 7 is so designed that a light pulse emitted outside by the reflecting mirror 2 of the laser resonator 3 is delayed by a predetermined optical distance $d_1$ and is then superposed on the light pulse in the laser resonator 3 by means of the reflecting mirror 2. The optical delay distance $d_1$ is so selected as to meet the following expression:

$$d_1 = 2nL \; (n=1, 2, 3, \ldots)$$

where L is the laser resonator length. Further, in FIG. 1 reference numeral 11 designates a light pulse output through the output mirror 1 of the laser resonator 3.

The operation of the laser device thus arranged will be described.

When the laser medium 4 is excited by the pumping source 6, a multi-longitudinal-mode oscillation light beam is produced, and because of the nonlinear transmission characteristics of the mode-locking element 5, a mode-locked light pulse which is small in time width and high in velocity is automatically produced. A part of the light pulse thus produced is emitted outside of the laser resonator 3, passing through the reflecting mirror 2. The light pulse thus emitted outside is returned into the laser resonator 3 after being optically delayed as much as $d_1$ (=2nL) by means of the total reflection mirrors 8, 9 and 10 so that the light pulse is superposed on the light pulse in the laser resonator. Therefore, the laser device of the invention is more stable in oscillation, generates fewer "satellite pulses," and is more stable in light pulse than passive mode-locking liquid laser devices which have no feedback systems. The term "satellite pulses" as used herein is intended to mean unwanted secondary pulses which appear in the skirt of a pulse having a repetitive frequency C/2L, where C is the velocity of light. In addition, the laser device of the invention is shorter in the pulse width of the light pulse output and larger in average output than conventional laser devices.

Figure 9:
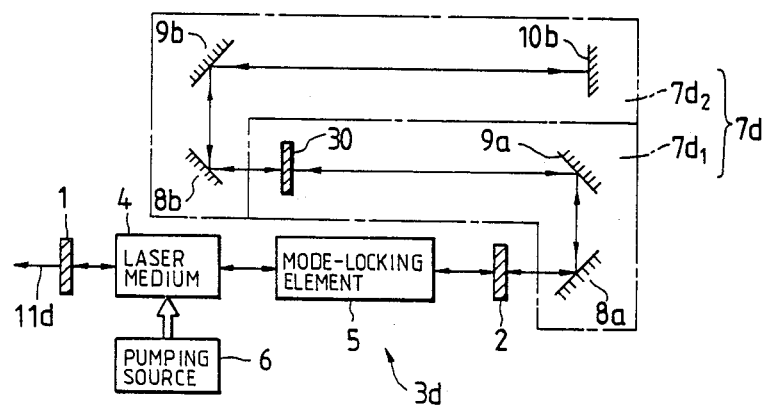
FIG. 9 is an explanatory diagram of another preferred embodiment of the laser device according to the present invention.

In the above-described embodiment, the feedback system is made up of three total reflection mirrors. However, the invention is not limited thereto or thereby. That is, the feedback system may be formed, for instance, as shown in FIG. 9. In FIG. 9, the feedback system 7d is made up of a first feedback system $7d_1$ comprising two total reflection mirrors 8a and 9a and a reflecting mirror 30 that transmits a part of the light pulse, and a second feedback system $7d_2$ comprising three total reflection mirrors 8b, 9b and 10b for returning the light pulse passed through the reflecting mirror 30 to the first feedback system $7d_1$. In FIG. 9, reference character 3d designates a laser resonator and 11d an output light pulse.

In the above-described embodiment, the light pulse passed through the reflecting mirror of the laser resonator is returned to the laser resonator so that it is superposed on the light pulse in the laser resonator. However, the invention is not limited thereto or thereby. That is, the laser device may be modified as shown in FIG. 2. In the laser device of FIG. 2, the feedback system 7a is so designed that the output light pulse of the output mirror 1 of the laser resonator 3a is split by means of a splitting mirror 12, and the resultant beam, namely, the feedback light beam, is returned to the laser resonator 3a by means of two total reflection mirrors 13 and 14, so that it is superposed on the light pulse in the laser resonator 3a. In this case, the optical delay distance $d_2$ corresponds to the distance which the light pulse covers when it goes from the output mirror 1 through the splitting mirror 12 and the total reflection mirror 13 to the total reflection mirror 14 and returns from the total reflection mirror 14 through the splitting mirror 12 to the output mirror 1. The feedback system 7a is so adjusted as to meet the formula $d_2=2nL$ (n=1, 2, 3, . . . ). In FIG. 2, reference character 2a designates a total reflection mirror and 11a an output light pulse.

In the above-described embodiments, the laser medium and the mode-locking element are disposed in the laser resonator. However, the invention is not limited thereto or thereby. That is, the technical concept of the invention is applicable to the case where the laser device of FIG. 2 is provided with a Q-switching element and/or a cavity damping element. FIG. 4 shows a mode-locking Q-switching laser device obtained by adding a Q-switching element to the laser device of FIG. 1 to which the technical concept of the invention is applied. In FIG. 4, the components, which have been previously described with reference to FIG. 1, are designated by the same reference numerals. In FIG. 4, reference numeral 15 designates a Q-switching element, such as an ultrasonic Q-switching element or electro-optical Q-switching element; 16 represents a drive circuit for driving the Q-switching element 15; and 3b represents a laser resonator. When, in the laser device of FIG. 4, the mode-locking pulse and the Q-switching pulse are adjusted in operation timing as indicated in FIGS. 5(a) and 5(b), then an output light pulse 11b as shown in FIG. 5(c) is provided.

Figure 7:
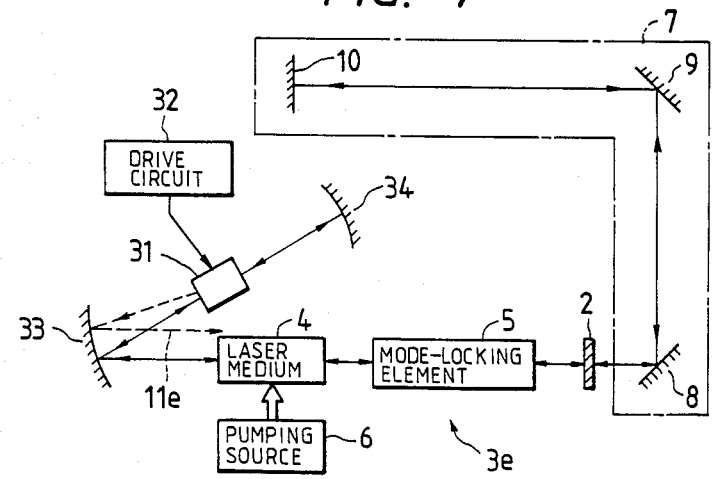
FIG. 7 is an explanatory diagram of another preferred embodiment of the laser device according to the present invention.
Figure 8:
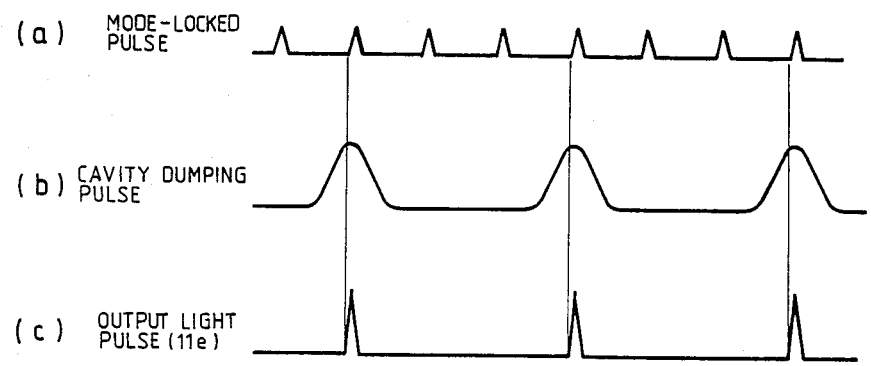
FIG. 8 is a pulse waveform diagram of signals present during the operation of the laser device shown in FIG. 7.

FIG. 7 shows a mode-locking cavity dumping laser device formed by adding a cavity dumping element to the laser device of FIG. 1 to which the technical concept of the invention is applied. In FIG. 7, reference numeral 31 designates a cavity dumping element comprising an ultrasonic light deflector, numerals 33 and 34 designate reflecting mirrors, and numeral 3e is a laser resonator. In the laser device of FIG. 7, when the timings of the mode-locking pulse and the cavity dumping pulse are adjusted as shown in FIGS. 8(a) and 8(b), respectively, then a light pulse output 11e, shown in FIG. 8(c), is emitted outside directly from the laser resonator 3e.

The technical concept of the invention is applicable to a mode-locking cavity dumping Q-switching laser device formed by adding a Q-switching element to the mode-locking cavity dumping laser device of FIG. 7.

In the above-described embodiments, the technical concept of the invention is applied to a liquid laser such as a dye laser. However, the invention is not limited thereto or thereby. That is, the technical concept of the invention is applicable to a gas laser such as an Ar ion gas laser, a solid laser such as an Nd YAG solid laser, or a semiconductor laser such as a GaAlAs semiconductor laser.

FIG. 3 shows a semiconductor laser to which the technical concept of the invention is applied. In FIG. 3, reference character 3c designates a laser resonator having a resonator length 1. The laser resonator 3c comprises a semiconductor 17 and a mode-locking element 18 of a nonlinear optical medium. The nonlinear optical medium may be such that defective parts are used in the active layer as they are. Further, in FIG. 3, reference numeral 19 designates an exciting source of d-c power for injecting carriers to the p-n junction of the semiconductor 17 to excite the semiconductor 17, and numeral 7c designates a feedback system comprising a lens 20 and a total reflection mirror 21. The feedback system 7c is so designed that the output light pulse of the laser resonator 3c is optically delayed by $d_3$ (=2l) and returned to the laser resonator 3c, so that it is superposed on the light pulse in the laser resonator 3c. Further, in FIG. 3 reference character 11c designates an output light pulse.

In the above-described embodiments, the technical concept of the invention is applied to the passive mode-locked laser device. However, the invention is not limited thereto or thereby. That is, the technical concept of the invention is applicable to an active mode-locking laser device in which a modulator such as an ultrasonic modulator or phase modulator is arranged in the laser resonator, and the modulator is modulated with a frequency equal to the longitudinal mode interval.

Furthermore, the technical concept of the invention is applicable to a synchronous mode-locked laser device in which, as employed generally in the mode-locking of a dye laser where the pumping source is a laser beam, the pumping laser beam is active mode-locked so that the length of the laser resonator is made equal to that of the pumping laser.

Figure 6:
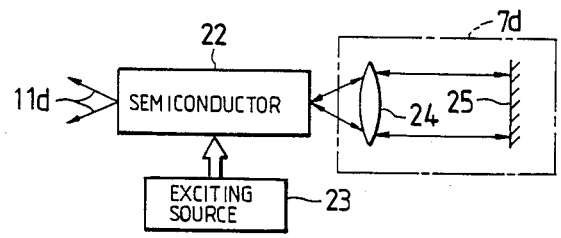
FIG. 6 is an explanatory diagram of another preferred embodiment of the laser device according to the present invention.

In the above-described embodiments, the technical concept of the invention is applied to a mode-locked laser device. However, the invention is not limited thereto or thereby. That is, the technical concept of the invention is applicable to a highly respectively pulsed laser device other than a mode-locked laser device. For instance, the technical concept of the invention is applicable to a semiconductor laser device, as shown in FIG. 6. In FIG. 6, an active element, namely a semiconductor 22, is modulated directly with a high frequency signal output by a high-frequency source 23 so that a light pulse 11d is output from the output end face of the semiconductor 22. In FIG. 5, reference character 7d designates a feedback system comprising a lens 24 and a total reflection mirror 25. In the feedback system 7d, the light pulse emitted from the opposite end face of the semiconductor 22 is guided through the lens 24 to the total reflection mirror 25, and the light pulse reflected from the mirror 25 is returned through the lens 24 and the opposite end face of the semiconductor 22 to the laser resonator so that it is superposed on the light pulse in the laser resonator with an optical delay $d_4 (=nC/f)$. In the expression, C is the velocity of light, f is the frequency of the high frequency source, and n is a positive integer.

In the feedback systems shown in FIGS. 1, 2, 3, 4, 6, 7 and 9, the total reflection mirrors are used to cause the light pulse to advance in the opposite direction. However, the invention is not limited thereto or thereby. That is, instead of the total reflection mirror 10 in FIG. 1, the total reflection mirror 14 in FIG. 2, the total reflection mirror 21 in FIG. 3, the total reflection mirror 10 in FIG. 4, the total reflection mirror 25 in FIG. 6, the total reflection mirror 10 in Figure 7, and the total reflection mirror 10b in FIG. 9, a nonlinear optical crystal such as a barium titanate crystal may be used so that the phase conjugate wave from the nonlinear optical crystal is superposed as feedback light on the light pulse in the laser resonator.

As described above, in the highly repetitively pulsed laser device of the present invention, the feedback system returns the light pulse, which is emitted from the laser resonator, to the laser resonator so that it is superposed on the light pulse in the laser resonator. The feedback system is simple both in construction and in adjustment. Therefore, by merely adjusting the optical delay distance of the feedback system, the laser device of the invention can output a light pulse more stable and shorter in pulse width than pulses outputted by conventional laser devices having no feedback systems. In addition, the device of the present invention increases the average output as compared with conventional devices.

Additional advantages and modifications will readily occur to those skilled in the art. The invention in its broader aspects is, therefore, not limited to the specific details, representative apparatus and illustrative method shown and described.

What is claimed is:

1. A repetitively pulsed laser device comprising:
   a laser resonator forming go and return paths for a light pulse;
   excitation means for exciting a light pulse through said go path, said light pulse exiting said laser resonator; and
   feedback means for returning the light pulse emitted from said laser resonator to said laser resonator through the return path, said light pulse being superposed on the light pulse in said laser resonator.

2. A device as claimed in claim 1, wherein said feedback means includes a total reflection mirror for returning said light pulse emitted from said laser resonator to said laser resonator,
   an optical delay distance provided by said total reflection mirror being adjusted to return said light pulse to be superposed on the light pulse in said laser resonator.

3. A device as claimed in claim 1, wherein said feedback means includes a nonlinear optical crystal for returning said light pulse emitted from said laser resonator to said laser resonator, wherein
   a phase conjugate wave from said nonlinear optical crystal is superposed, as feedback light, on the light pulse in said laser resonator.

4. A device as claimed in claim 1, wherein said device is a mode-locked laser device in which a gas, liquid, solid or semiconductor laser is mode-locked using a mode-locking element.

5. A device as claimed in claim 1, wherein said device is a mode-locked, Q-switched laser device in which a gas, liquid or solid laser is Q-switched and mode-locked using a Q-switching element and a mode-locking element.

6. A device as claimed in claim 1, wherein said device is a mode-locked, cavity-dumping laser device in which a gas, liquid or solid laser is cavity-dumping and mode-locked using a cavity-dumping element and a mode-locking element.

* * * * *